May 24, 1949.  G. C. GUEST  2,470,848
BOAT CARRIER FOR AUTOMOBILES
Filed Aug. 1, 1947  2 Sheets-Sheet 1
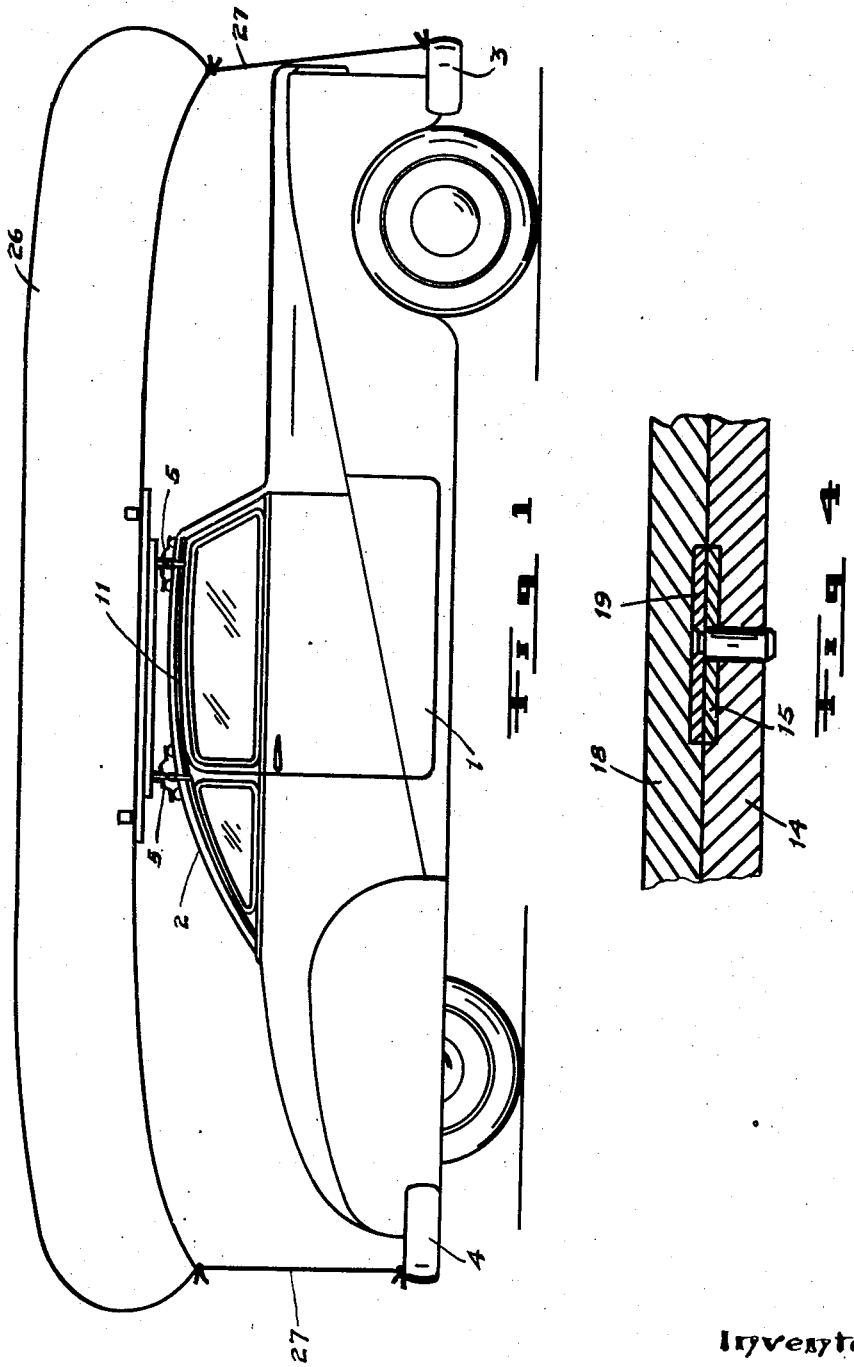
Inventor
G. C. Guest
By
Walter Q. Doggey
AGENT May 24, 1949.  G. C. GUEST  2,470,848
BOAT CARRIER FOR AUTOMOBILES
Filed Aug. 1, 1947  2 Sheets-Sheet 2
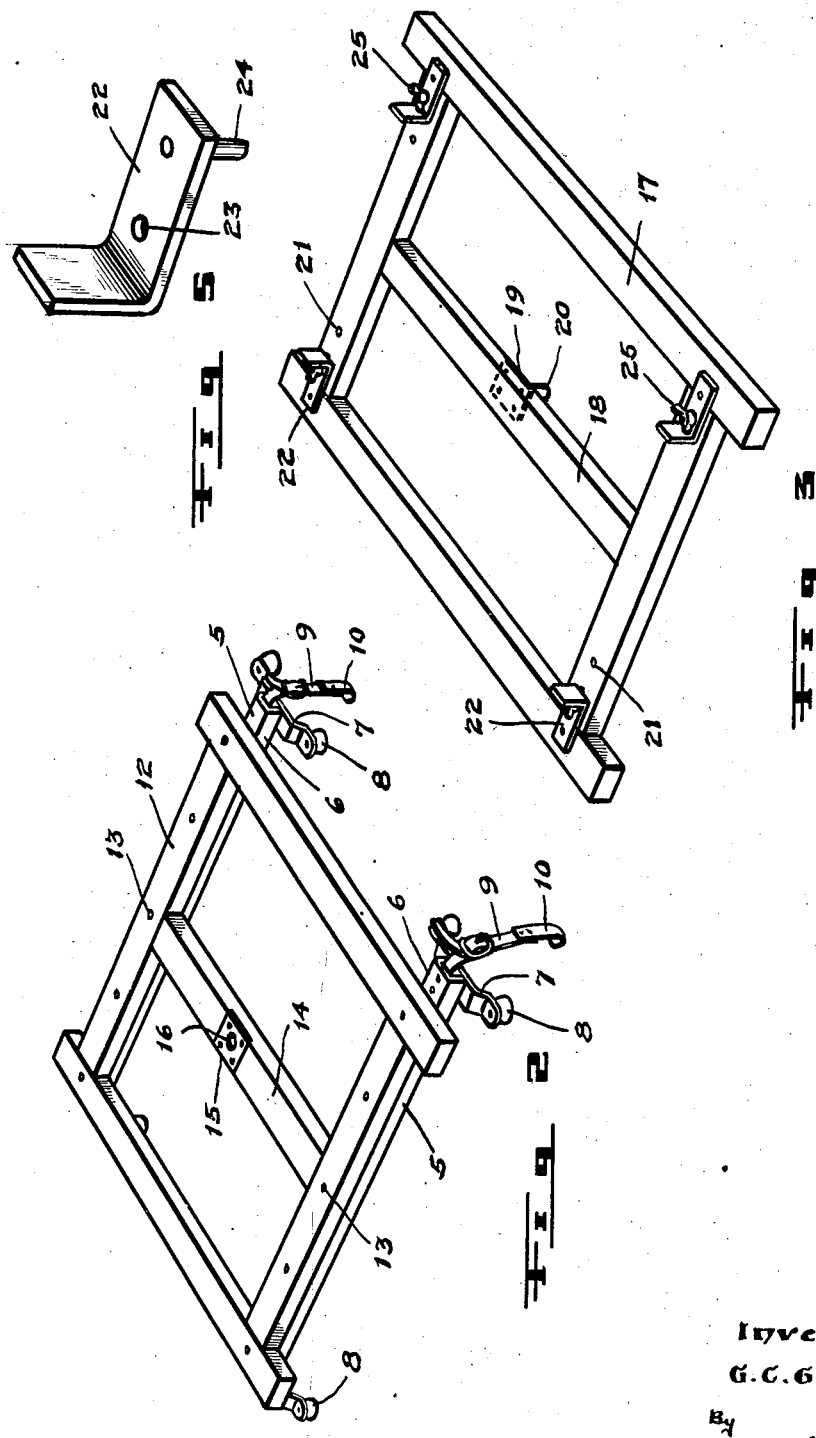
Inventor
G. C. Guest
By
Walter C. Boggus
AGENT Patented May 24, 1949

2,470,848

UNITED STATES PATENT OFFICE 2,470,848

BOAT CARRIER FOR AUTOMOBILES

George C. Guest, Winnipeg, Manitoba, Canada

Application August 1, 1947, Serial No. 765,293

3 Claims. (Cl. 224—42.1)

1

The invention relates to carriers for holding a boat on the roof of an automobile so that the same can be transported from place to place, and the principal object of the invention is to provide a carrier having a pivotal support so that the boat can be loaded on the carrier from the side of the automobile by one man, can be swung into a lengthwise position and then lashed so that it will not move when the automobile is in motion.

A further object of the invention is to fasten the base frame of the carrier to the automobile roof by suction cups and straps and provide means to hold the boat and the pivotal support from movement during transportation and by friction.

A still further object of the invention is to construct the device in a simple, cheap and durable manner for quick assembly on the automobile and for low cost of manufacture.

With the above important objects in view the invention consists essentially in the construction and arrangement of parts hereinafter more particularly described, reference being had to the accompanying drawings in which:

Figure 1 is a side view of an automobile with the invention attached thereto and supporting a boat in lashed position.

Figure 2 is an enlarged perspective view of the base member.

Figure 3 is an enlarged perspective view of the pivotal member.

Figure 4 is an enlarged section showing the pivot connection between the two members.

Figure 5 is a perspective view of the boat retaining strip.

In the drawings like characters of reference indicate corresponding parts in the several figures.

A coupe automobile 1 is shown in Figure 1, having a curved roof 2 and front and rear bumpers 3 and 4 respectively. In providing a boat carrier for the roof of the automobile, a pair of front and rear cross bars 5, having suction cups at the ends, are used. Such bars are well known and can be bought ready made in the stores and comprise a channel 6, having a double stepped-down bracket 7 at each end which is mounted at right angles to the channel. On the ends of the brackets, suction cups 8 are mounted, and these cups are pressed against the roof of the automobile and atmospheric air pressure holds them firmly thereto without slipping so that the channels are maintained in position above the car for any suitable supporting purpose. To further insure that the channels will not slip, the ends are provided with adjustable leather straps 9 having metal hook members 10 on the free ends thereof. These hooks are caught in the drain trough 11 which runs along each side of the automobile. The invention will now be described.

A rectangular shaped open frame 12, shown in Figure 2, is suitably fastened as by bolts or rivets 13 to the front and rear channels 6. This frame carries a central cross bar 14, having a central metal plate 15 suitably fastened thereto and sunk flush with the surface of the cross bar. A hole 16 is drilled or bored through this plate and the bar. From the above it will be seen that, when the suction cups are connected on the automobile roof, the frame will be sitting horizontally in position thereover. I term this member a base frame.

A second similar frame 17 is provided the same width as the base frame but slightly longer. This second frame is also provided with a central cross bar 18, having a central plate 19, but this central plate is fastened flush on the under side of the cross bar with a pin 20 extending downwardly therefrom for reception within the central hole 16 of the base frame. When this second frame is so mounted on the base frame, the surfaces of the two frames are in contact but, due to the pin 20, this second frame can be turned on the base frame and against the friction. I term this second frame a pivotal frame.

A line of four holes 21 are provided at each corner of the pivotal frame, the lines extending crosswise. Metal strips 22, of an L-shape, are provided at each corner, with the short part of the L projecting upwardly. One of these strips is shown in Figure 5 and it will be noted that a hole 23 is provided through the strip adjacent to the bend while a pin 24 extends downwardly a little farther back. When in position on the pivotal frame, a bolt, having a wing nut 25, is passed through one of the holes 21 and the hole 23 to secure the strip to the frame. The pin 24 drops into one of the holes 21 and holds the strip in line. The holes 21 are the same distance apart as the holes 23 and the pin 24. If an adjustment is required, the wing nut 25 can be unscrewed and the bolt removed. The strip can then be lifted, the pin 24 dropped into another hole 21, and as the hole 23 will be in alignment with another hole 21, the bolt can be replaced in the aligned holes and fastened.

In operation, the pivotal frame is turned until the long side is across the automobile with the edge projecting slightly over the side thereof. A boat 26 is carried to the side of the automobile and one end is placed on the ground while the upper end is rested against the pivotal frame, The operator can then lift the lower or ground end of the boat and slide the boat completely onto the pivotal frame, the keel being upmost and the sides of the boat being guided and held from side movement by the upwardly projecting ends of the strips 22. The boat and the pivotal frame can then be swung on the base frame until the boat is lengthwise of the machine. Two ropes 27 can be provided at each end of the boat and these can be lashed to each end of the bumpers 3 and 4 so that they form an inverted V-shape at each end of the automobile. These lashings hold the boat firmly down against the pivotal frame so that the suction cups are pressed tightly against the surface of the automobile roof and will not give or slip. At the same time, this pressure increases the contact pressure of the pivotal frame against the base frame and friction insures that no swinging of the boat will result. It would be readily understood that if such swinging were permitted, it might cause the automobile to go into the ditch or result in a serious accident. The boat is removed from the automobile in the reverse manner to the above.

From the above description and explanations, it will be apparent that one man will be able to load the boat onto his automobile or take it off. In present carriers, such loading and unloading is a two man job. The boat will be rigidly held to the automobile roof when being transported and in the majority of cases will withstand the pressure of the wind without shifting. If any shifting or loosening does occur the noise would be noticeable and the steering would unmanageable. The automobile can be stopped, the lashings released, and one man can unload the boat, fix the trouble and reload it on the highway without assistance.

It might be mentioned at this time that, when the invention is installed on a sedan or coach automobile, the base frame may be the same size as the pivotal frame. The shorter base frame is provided on coupes because of the smaller roof area.

What I claim as my invention is:

1. A boat carrier for an automobile, comprising: an open base frame having a cross member fastened thereunder at each end; the ends of said cross members provided with downwardly projecting rubber suction cups for attachment to the roof of an automobile; a central cross bar on said base frame having a central hole therethrough; a secondary open frame supported above and by said base frame; said secondary frame having a central cross bar with a central downwardly projecting pin thereon; said pin receivable in said central hole; and means on said secondary frame for restrainingly aligning a boat thereon.

2. A boat carrier for an automobile, comprising: a base frame releasably mounted on the roof of an automobile and provided with a central vertical hole therethrough; a secondary pivotal frame supported above and by said base frame and provided with a central downwardly extending pin receivable in said hole; a line of holes on and adjacent the corners of said pivotal frame; L-shaped straps positioned at said corners; said straps having a downwardly projecting pin for reception within one of said holes; and a securing member passing through another of said holes and through a hole in said straps to secure said straps to said pivotal frame.

3. In combination with an automobile having a roof portion and front and rear bumpers; a boat carrier for said automobile, comprising: a horizontal base frame releasably secured to the roof of said automobile; a pivotal frame rotatably mounted on and supported by said base frame; said pivotal frame provided at the corners with adjustable L-shaped straps for aligning and restraining the sides of a boat slid onto said pivotal frame; and lashing means connecting the ends of said boat to said bumpers and to press said boat against said pivotal frame to increase the frictional resistance between said pivotal frame and said base frame.

GEORGE C. GUEST.

REFERENCES CITED

The following references are of record in the file of this patent:

UNITED STATES PATENTS

| Number | Name | Date |
| --- | --- | --- |
| 1,084,022 | Martin | Jan. 13, 1914 |
| 1,826,470 | Hutchinson | Oct. 6, 1931 |
| 2,434,387 | Brandt | Jan. 13, 1948 |